April 19, 1949. A. B. EDWARDS, JR 2,467,883
FLUID PRESSURE DEVICE
Filed July 17, 1946 2 Sheets-Sheet 1

INVENTOR.
Alfred B. Edwards, Jr.
BY
Johnson, Kline and Hensel
ATTORNEYS

April 19, 1949.  A. B. EDWARDS, JR  2,467,883
FLUID PRESSURE DEVICE

Filed July 17, 1946  2 Sheets-Sheet 2

INVENTOR.
Alfred B. Edwards, Jr
BY
Johnson, Kline and Hensel
ATTORNEYS

Patented Apr. 19, 1949

2,467,883

UNITED STATES PATENT OFFICE 2,467,883

FLUID PRESSURE DEVICE

Alfred B. Edwards, Jr., Plandome, N. Y., assignor of one-half to Rodney Edwards, Brooklyn, N. Y.

Application July 17, 1946, Serial No. 684,377

11 Claims. (Cl. 137—156.5)

This invention relates to a fluid pressure device of the type employed for actuating brakes, jacks, presses, and similar mechanisms requiring pushing or pulling force for their operation.

One object of my invention is to provide a fluid pressure device of the aforesaid type of simple and economical and compact construction, in which the parts can be readily and cheaply manufactured and assembled, and which, though relatively small in cross-section, can provide an actuating force of relatively great magnitude while employing a fluid at relatively moderate pressure. In connection with the foregoing object, it is an object of the invention to provide a fluid pressure device of the aforesaid type in which the fluid chambers are not traversed by any relatively movable parts, so that no packing is required to prevent escape of the fluid from the chambers.

It was known heretofore to provide fluid pressure devices having a series of expansible chambers or cells with their opposite walls interconnected in a series, as in a bellows, the series expanding on introduction of a pressure fluid therein to actuate a mechanism. In this type of fluid pressure device, the force generated by fluid at a given pressure is merely the force generated in one chamber of the series, an increase in force requiring fluid at a higher pressure or an increase in the area of the chambers. The range of movement through which the resulting force may act, however, is cumulative and can be increased indefinitely by increasing the number of chambers. While such devices are suitable for providing a limited force for producing motion over a relatively extensive range, they are, in general, unsuitable for operating mechanism requiring a relatively great force, since an increase in the pressure area of each chamber renders the device cumbersome and an increase in the pressure of the fluid is limited by the relatively low resistance of the necessarily flexible walls of the chambers.

It has been suggested to construct a fluid pressure device having a series of expansible chambers with the walls on one side of each of the chambers mechanically interconnected and joined to one part of a mechanism, and the walls on the other side of the chambers mechanically interconnected and joined to another part of the mechanism, so that upon introduction of a fluid into the chambers, the expanding force generated in the chambers is cumulatively applied to move the two parts of the mechanism apart. The extent of movement is limited to the range of expansion of one chamber, but such a device permits generation of a relatively large force by means of fluid at a moderate pressure, and the magnitude of the total force can be indefinitely increased by increasing the number of chambers.

In one fluid pressure device of the latter type, heretofore proposed, a rigid casing is provided having a series of cells, each having a flexible diaphragm therein to form a chamber with one wall of the cell, on the same side of each diaphragm. The diaphragms are interconnected by a central rod extending through the chambers. Upon admitting fluid under pressure to said chambers, force applied to the diaphragms is cumulatively transmitted to their interconnecting rod, tending to move the same relative to the casing in the direction of the force. The rod interconnecting the diaphragms traverses the fluid retaining wall of each chamber and is movable relative thereto, so that a packing is required to prevent leakage of the fluid around the rod. Such packings are likely to fail, permitting the fluid to leak, and the device is likely to require considerable maintenance during use. In addition, the construction and assembly of the device is relatively expensive.

In accordance with my invention, a series of support members or plates are provided, arranged in spaced face-to-face relation, alternate plates in the series being mechanically interconnected to form one substantially rigid unit or assembly and the other plates of the series being similarly interconnected to form a second substantially rigid unit or assembly, movable in the direction of the center-line of the series with respect to the first unit. The parts mechanically interconnecting the plates of the two units are preferably located adjacent the periphery of the plates. A plurality of expansible fluid chambers are positioned in alternate spaces between the plates of the series, preferably extending between the interconnecting members of the units so that said members are exterior to the chambers. Upon introduction of a fluid under pressure into the chambers, the force generated therein is cumulatively applied to the two assemblies, tending to move one relative to the other in the direction of the center line of the series of plates. By connecting the assemblies respectively to relatively movable parts of a mechanism offering resistance to relative movement, the cumulative force of the fluid pressure device can be exerted for overcoming the resistance.

By disposing the members interconnecting the plates of respective assemblies adjacent the periphery of the plates, and placing the fluid chambers between said members so that the interconnecting means are external to the chambers, no relatively movable part of either assembly traverses the fluid chambers, and hence no packing to permit such movement is required. Accordingly, the chambers can be simply and readily constructed to retain fluid under pressure and remain operative and tight for an indefinite period of use.

Additional objects and advantages of my invention will appear from the following description, taken in connection with the accompanying drawings, illustrating preferred embodiments of the invention, and wherein Figure 1 is an axial cross-section of a fluid pressure device in accordance with my invention.

Figure 1:
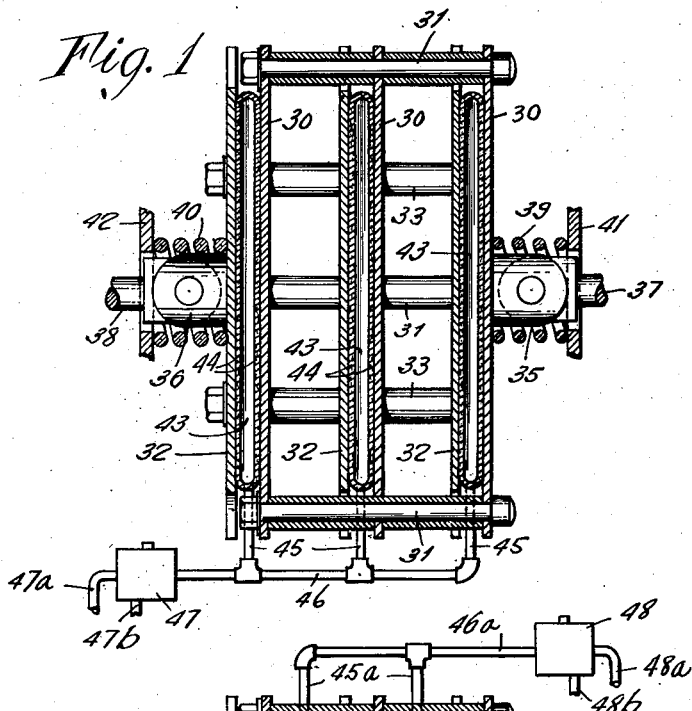

Referring to the drawings, the device comprises a series of substantially rigid ram plates arranged in spaced face-to-face relation and connected together to form a rigid unit and a series of similar housing plates interconnected to form a rigid unit. The series is herein illustrated as having three plates although any number may be used. The two units are arranged with the plates in alternate positions and an expansible or inflatable means provided between plates providing axial displacement of the units. The ram plates and housing plates may be made either flat or dish-like shaped, as required, and can be readily stamped or otherwise formed from sheet metal.

Figure 4:
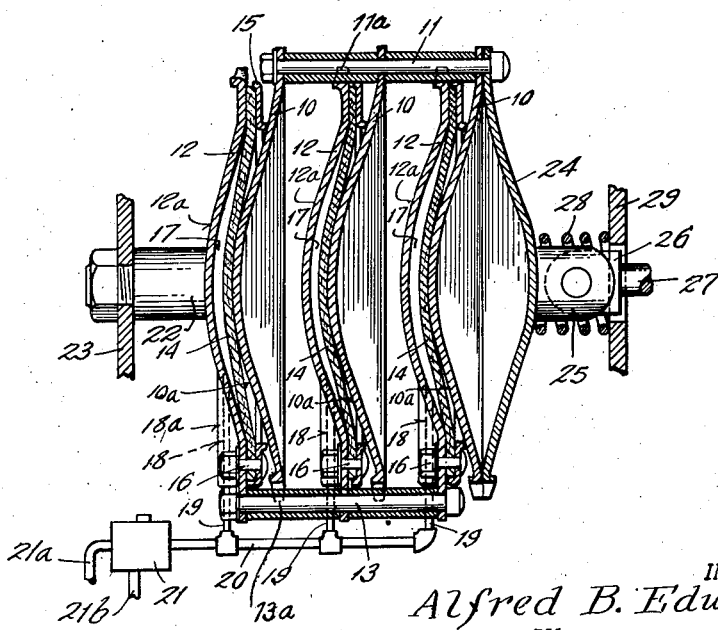
Fig. 4 is a view similar to Fig. 1 of a third form of the invention.

In the form of the invention shown in Fig. 4, the ram plates 10 are interconnected to form a rigid unit by spacer rods 11 arranged about the periphery and to which the plates are secured. The ram plates 10 are of dish-like shape providing great rigidity against transverse flexure, and are arranged with their convex surfaces 10a all facing in the same direction in the series.

A corresponding number of housing plates 12 are arranged in similarly spaced relation, and interconnected by spacer rods 13 likewise disposed about the periphery and secured to these plates adjacent their periphery to form a second rigid unit or assembly. The housing plates 12 are of a dish-like shape similar to the ram plates 10, and are likewise arranged to face in the same direction in the unit. The two units are brought together in such manner that housing plates 12 are co-axially disposed with respect to the ram plates 10, the concave surface 12a of each housing plate facing the convex surface 10a of one of the ram plates 10. Notches 13a can be formed at the periphery of ram plates 10 to receive spacer rods 13 of the housing plates 12, and similar notches 11a formed at the periphery of the housing plates 12 to receive the spacer rods 11 of the ram plates.

Each of the housing plates 12 is provided with a diaphragm 14 of flexible material, extending across its concave surface 12a, and secured to the plate adjacent its periphery, for example, by means of a retaining ring 15 and bolts 16 for clamping the ring to the plate. The diaphragm may be of any suitable flexible material adapted to withstand fluid pressure, for example, rubber, preferably reinforced to prevent substantial extension or stretching thereof, fabric impregnated with a flexible composition rendering it impervious to fluid, or other materials of similar nature having sufficient strength to retain the fluid under the pressure to be employed.

Each of the diaphragms 14 together with the housing plate 12 to which it is attached forms a chamber 17 adapted to receive a fluid under pressure and to expand under the influence of the pressure in the direction of the center line of the assembly. In order to permit the introduction of fluid under pressure into the chambers formed by said diaphragms and housing plates, a port 18 is formed, for example, in a thickened portion 18a of the housing plate, said port communicating with the interior of the chamber 17 formed by the housing plate and its diaphragm. The ports 18 are advantageously connected by tubes 19 with a header 20 which is in turn connected to a fluid pressure supply through a control valve 21, having an inlet 21a and an outlet or exhaust 21b.

The terminal housing plate having its convex surface exposed at the left-hand end of the device shown in Fig. 4 can be secured, for example by post 22, to a part 23 of the frame of a mechanism to be operated. A convex cover plate 24 can be secured at the opposite end of the device to the terminal ram plate 10 to provide a convex surface similar in shape to the exposed surface of the terminal housing plate 12 at the other end of the pressure device. Cover plate 24 as illustrated is connected by a bifurcated link 25 with a link 26 on the end of the operating rod 27 for actuating the mechanism by outward movement relative to the frame 23. If desired, a compression spring 28, backed by another part 29 of the frame of the mechanism can be provided for urging the cover plate 24 and ram plates 10 toward the housing plates 12 and to return rod 27 to its original position when the fluid pressure device is inoperative. Under the force of the spring 28, the ram plates 10 urge diaphragms 14 toward their respective housing plates 12, thus contracting the chambers 17 formed by said housing plates and diaphragms.

In the operation of the device, a fluid under pressure such as air, oil, water, or other fluids, is admitted through the control valve 21 to the header 20, and through tubes 19 and ports 18 to the fluid pressure chambers 17 between the housing plates 12 and diaphragms 14. Pressure applied to each diaphragm forces it against the contiguous convex surface 10a of the adjacent ram plate 10. The force generated by application of the fluid pressure to the contiguous areas of the diaphragms and ram plates is transmitted to the ram plates and thence cumulatively through spacer rod 11, cover plate 24, links 25 and 26, to the operating rod 27, tending to move the rod away from the frame 23. Upon releasing of the pressure of the fluid in chambers 17, spring 28 returns the ram plates 10 to their initial position forcing the diaphragms 14 toward their housing plates 12 and thus expelling fluid from the chambers 17 back to the header 20 and thence through the control valve 21 to the exhaust line 21b of the fluid system.

By reason of the convex shape of ram plate surfaces 10a diaphragms 14 in contact therewith, when subjected to increasing fluid pressure within chambers 17, expand in such a manner that progressively increasing portions of their areas are brought into contact with the convex ram plate surfaces 10a, the force transmitted to each ram plate being proportional to the extent of said contiguous area. When the cumulative force is sufficient to overcome the resistance to movement offered by rod 27 and spring 28, the ram plates 10 move outward from the corresponding housing plates 12, thus moving rod 27 away from frame 23, and compressing spring 28. The total force causing such movement of the ram plate assembly and rod 27 is the sum of the forces applied to the respective ram plates.

In the form of the invention shown in Fig. 1, a set of flat ram plates 30 are interconnected by spacer rods 31 to form one rigid unit or assembly, and a second set of plates 32 similar in form to plates 30 and positioned in spaced coaxial face-to-face relation with plates 30, are interconnected by spacer rods 33 to form a second rigid assembly or unit movable along the center line of the plates, relative to the first unit. Plates 32 differ from housing plates 12 in that they have no port therein and do not form the wall of a fluid pressure chamber.

The terminal plate 32 of the second unit as well as the terminal plate 30 on the first unit at the opposite end of the device are respectively connected, e. g. by pivotal link connections 35 and 36 to operating rods 37 and 38, which constitute relatively movable parts of a mechanism to be operated by moving them apart in the direction of the axis of the plate assemblies. A pair of compression springs 39 and 40 bearing respectively on terminal plate 30 and on terminal plate 32, and backed by supports 41 and 42, can be provided for urging the two plate assemblies together.

A plurality of fluid pressure chambers 43 are interposed in the alternate spaces between the plates in the series, each of said chambers comprising two walls 44, of flexible material secured together at their edges to form, in effect, a bladder which can be expanded upon introduction of fluid under pressure therein. These chambers are connected at their peripheries by tubes 45 to a header 46 which in turn is connected to a source of fluid under pressure through a control valve 47 having an inlet 47a and an exhaust 47b.

Upon introducing fluid under pressure through the valve 47, header 46, and tubes 45 into the chambers 43, the walls 44 of the latter are forced apart against the surfaces of adjacent plates 30 and 32, the pressure of the fluid in the chambers being transmitted to the plates so as to move the units, respectively comprising plates 30 and plates 32, in opposite directions, the force transmitted to the plates of the respective units being cumulatively applied in urging rod 37 away from rod 38 and compressing springs 39 and 40. In the illustrated device, upon releasing the pressure of the fluid in the chambers, springs 39 and 40 force the two units together compressing the fluid chambers 43 returning the fluid through tubes 45 to the header 46, and moving rods 37 and 38 together again.

Figure 2:
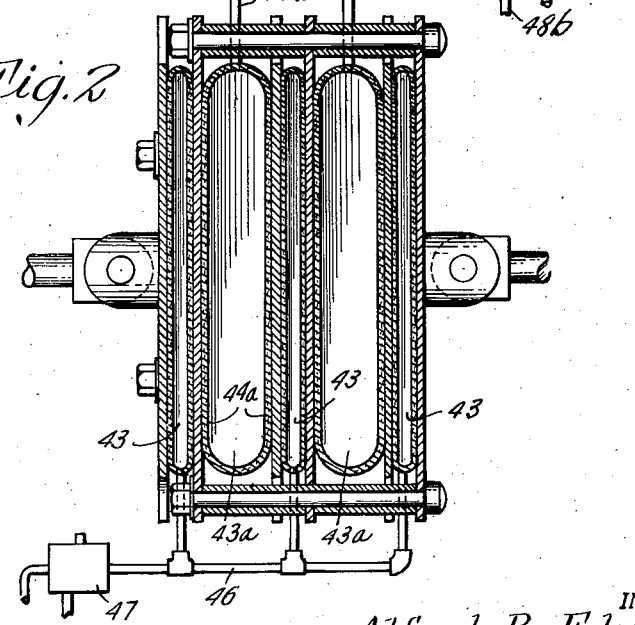
Fig. 2 is a view similar to Fig. 1 of another form of the invention.
Figure 3:
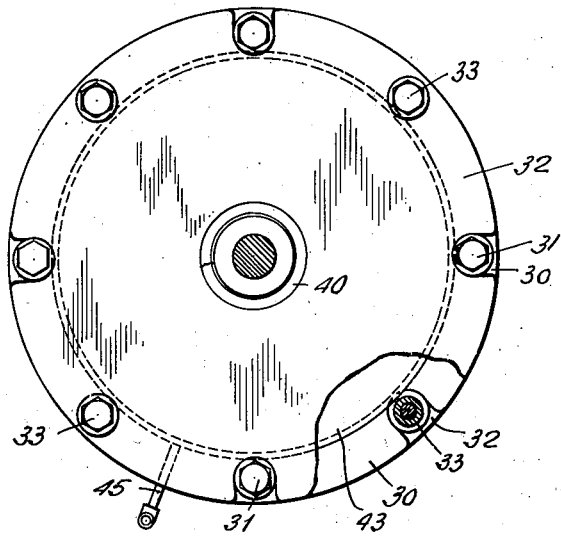
Fig. 3 is a view of the left-hand end of the device shown in Fig. 1.

In the form of the invention shown in Fig. 2 the action of the device is completely fluid pressure controlled. The device is similar to that shown in Fig. 1 except that in lieu of the return springs for returning the units to normal position, fluid pressure means are employed. This is accomplished by inserting fluid pressure chambers 43a in the spaces between the ram plates and housing plates. The pressure chambers comprise two walls 44a of flexible material connected at their edges to form a bladder which can be expanded by the introduction of fluid under pressure therein. The chambers are connected at their peripheries by tube 45a to a header 46a which is connected to a source of fluid under pressure through control valve 48 having an inlet 48a and an exhaust 48b.

In the operation of the device in this form of the invention introduction of fluid under pressure through valve 47, header 46 into chambers 43 will expand the pressure chambers and move the units in a manner described in connection with Fig. 1. When it is desired to return the units to normal position, pressure in the chambers 43 is relieved and pressure is introduced through valve 48, header 46a, tubes 45a into the chambers 43a which will cause the units to reverse their direction of movement and return to normal position.

If desired, the relative position of the two sets of plates may be accurately controlled throughout the operation of the device by regulating the fluid in each of chambers 43 and 43a.

The fluid pressure device of my invention can be used for operating any device requiring relatively limited movement for its operation, but necessitating a relatively large force to produce relative movement of portions of its mechanism. Thus the device can be used for operating brakes, jacks, presses (e. g. for shearing, forming, or stamping operations) and similar devices. In view of the fact that the force produced when using fluid at relatively moderate pressure is cumulatively applied to the relatively movable parts, the total force depending on the number of fluid pressure chambers employed, the device can be constructed to be compact and at the same time to perform tasks requiring relatively great force. In view of the fact that no relatively movable part of the device traverses the fluid pressure chambers or any expansible part thereof, the necessity for providing packings and the resultant danger of leakage is avoided. As a result, the parts of the device can be economically and readily manufactured and assembled, and the device requires substantially no maintenance during operation over indefinitely long periods.

Variations and modifications may be made within the scope of this invention and portions of the improvements may be used without others.

I claim:

1. In a fluid pressure device, a series of rigid support members in spaced face-to-face relation; means interconnecting alternate members in the series to form a rigid unit; means interconnecting the other members of the series to form a second rigid unit movable relative to the first unit in the direction of the center line of the series; a plurality of expansible fluid chambers disposed in alternate spaces in the series between said support members, said chambers being expansible in the direction of the center line of the series, and said interconnecting means being external to said fluid chambers; and means for introducing fluid under pressure to said chambers for expanding the same and thereby forcing said units in opposite directions along the center line of the series.

2. In a fluid pressure device, a series of rigid plates in spaced face-to-face relation; means adjacent the periphery of said plates interconnecting alternate plates in the series to form a rigid unit; separate means adjacent the periphery of said plates interconnecting the other plates of said series to form a second rigid unit movable relative to the first unit in the direction of the center line of said series; a plurality of fluid chambers disposed in alternate spaces between said plates, each comprising a flexible diaphragm on at least one side thereof expansible in the direction of the center line of said series, said interconnecting means being exterior to said chambers; and means for introducing fluid under pressure into said chambers for expanding said diaphragms against the adjacent plates and thereby forcing said units in opposite directions along the center line of the series.

3. In a fluid pressure device, a series of rigid plates in spaced face-to-face relation; means adjacent the periphery of said plates interconnecting alternate plates in the series to form a rigid unit; separate means adjacent the periphery of said plates interconnecting the other plates of said series to form a second rigid unit movable relative to the first unit in the direction of the center line of said series; flexible diaphragms secured to similar faces of alternate plates in the series and forming with said plates a plurality of fluid chambers in alternate spaces between the plates of the series, said diaphragms being expansible in the direction of the center line of the series, and said interconnecting means being exterior to the chambers enclosed by said diaphragms and the plates to which they are secured; and means for introducing fluid under pressure into said fluid chambers to expand said diaphragms against the adjacent plates of the other unit and thereby forcing the units in opposite directions along the center line of said series.

4. In a fluid pressure device, a series of rigid plates in spaced face-to-face relation; means adjacent the periphery of said plates interconnecting alternate plates in the series to form a rigid unit; separate means adjacent the periphery of said plates interconnecting the other plates of said series to form a second rigid unit movable relative to the first unit in the direction of the center line of said series; a plurality of fluid chambers, each comprising a pair of flexible diaphragms joined at their peripheries, interposed in alternate spaces between the plates in the series, said chambers being expansible upon introduction of fluid under pressure therein against the adjacent plates of said series, and said interconnecting means being exterior to said fluid chambers; and means for introducing fluid under pressure into said chambers for expanding them and thereby forcing said units respectively in opposite directions along the center line of said series.

5. In a fluid pressure device, a series of rigid plates of dish-like shape arranged in spaced face-to-face relation, the concave surfaces of said plates facing in the same direction in the series; means adjacent the periphery of said plates interconnecting alternate plates in the series to form a rigid unit; separate means adjacent the periphery of said plates interconnecting the other plates in said series to form a second rigid unit, movable relative to the first unit in the direction of the center line of the series; flexible diaphragms extending over the concave surfaces of the plates of one unit and secured to said plates respectively to form a plurality of fluid chambers in alternate spaces between the plates in the series, said chambers lying within the limits of said interconnecting means so that the latter are exterior to said chambers, and said diaphragms being expansible against the adjacent plates of the other unit; a port in each of said diaphragm-bearing plates for admitting fluid under pressure to the chamber between the plate and diaphragm for expanding the diaphrgam, means connecting said ports to a fluid pressure supply; and means for connecting said units respectively to relatively movable parts of a mechanism requiring force for its operation.

6. In a fluid pressure device, a series of rigid flat plates arranged in spaced face-to-face relation; means adjacent the periphery of said plates interconnecting alternate plates in the series to form a rigid unit; separate means adjacent the periphery of said plates interconnecting the other plates in said series to form a second rigid unit, movable relative to the first unit in the direction of the center line of the series; a plurality of fluid chambers, each comprising a pair of flexible diaphragms joined at their peripheries, interposed in alternate spaces between the plates of the series, said chambers being expansible upon introduction of fluid under pressure therein against the adjacent plates of said series, and said chambers lying within the limits of said interconnecting means so that the latter are exterior to said chambers; a port in each of said chambers at the periphery thereof for admitting fluid under pressure to the chambers; means for connecting said ports to a fluid pressure supply; and means for connecting said units respectively to relatively movable parts of a mechanism requiring force for its operation.

7. In a fluid pressure device, a series of rigid plates in spaced face-to-face relation; means adjacent the periphery of said plates interconnecting alternate plates in the series to form a rigid unit; separate means adjacent the periphery of said plates interconnecting the other plates of said series to form a second rigid unit movable relative to the first unit in the direction of the center line of said series; means for urging the plates of one unit toward the plates of the other unit; fluid-pressure means interposed between opposing faces of the plates and lying within the periphery thereof; and means for introducing fluid under pressure into said fluid-pressure means for moving said plates in opposite directions along the center line of the series.

8. In a fluid pressure device, a series of rigid plates in spaced face-to-face relation; means adjacent the periphery of said plates interconnecting alternate plates in the series to form a rigid unit; separate means adjacent the periphery of said plates interconnecting the other plates of said series to form a second rigid unit movable relative to the first unit in the direction of the center line of said series; spring means for urging the plates of one unit toward the plates of the other unit; fluid-pressure means interposed between opposed faces of the plates and lying within the periphery thereof; and means for introducing fluid under pressure into said fluid-pressure means for moving said plates in opposite directions along the center line of the series.

9. In a fluid pressure device, a series of rigid support members in spaced face-to-face relation; means interconnecting alternate members in the series to form a rigid unit; means interconnecting the other members of the series to form a second rigid unit movable relative to the first unit in the direction of the center line of the series; a plurality of expansible fluid chambers disposed in alternate spaces in the series between said support members, said chambers being expansible in the direction of the center line of the series, and said interconnecting means being external to said fluid chambers; means for introducing fluid under pressure to said chambers for expanding the same and thereby forcing said units in opposite directions from normal position along the center line of the series; and fluid pressure means for returning said units to normal position.

10. In a fluid pressure device, a series of rigid plates in spaced face-to-face relation; means adjacent the periphery of said plates interconnecting alternate plates in the series to form a rigid unit; separate means adjacent the periphery of said plates interconnecting the other plates of said series to form a second rigid unit movable relative to the first unit in the direction of the center line of said series; fluid-pressure means for moving the plates of one unit toward the plates of the other unit; separate means interposed between adjacent faces of the plates and lying within the periphery thereof for moving the plates of one unit away from the plates of the other unit; and means for introducing fluid under pressure into each of said fluid-pressure means for moving said plates in either direction along the center line of the series.

11. In a fluid pressure device, a series of rigid sheet metal plates in face-to-face relation; means adjacent the periphery of said plates including spacer means interconnecting alternate plates in the series to form a rigid unit of spaced plates; separate means adjacent the periphery of said plates including spacer means interconnecting the other plates of the series to form a second rigid unit of spaced plates movable relative to the first unit in the direction of the center layer of the unit; means for urging the plates of one unit toward the plates of the other series; fluid-pressure means interposed between adjacent faces of the plates and lying within the periphery thereof for moving the plates of one unit away from the plates of the other unit; and means for introducing fluid under pressure into said fluid-pressure means for moving said plates in opposite directions along the center line of the series.

ALFRED B. EDWARDS, Jr.

REFERENCES CITED

The following references are of record in the file of this patent:

UNITED STATES PATENTS

| Number | Name | Date |
|---|---|---|
| 1,995,611 | Hapgood | Mar. 26, 1935 |

FOREIGN PATENTS

| Number | Country | Date |
|---|---|---|
| 34,296 | Austria | 1908 |

Certificate of Correction

Patent No. 2,467,883.  April 19, 1949.

ALFRED B. EDWARDS, Jr.

It is hereby certified that errors appear in the printed specification of the above numbered patent requiring correction as follows:

Column 9, line 15, claim 10, after the word "separate" insert *fluid-pressure*; column 10, line 7, claim 11, for "series" read *unit*;
and that the said Letters Patent should be read with these corrections therein that the same may conform to the record of the case in the Patent Office.

Signed and sealed this 18th day of October, A. D. 1949.

[SEAL]

THOMAS F. MURPHY,
*Assistant Commissioner of Patents.*